(12) United States Patent
Mitsuda et al.

(10) Patent No.: US 8,790,811 B2
(45) Date of Patent: Jul. 29, 2014

(54) FLAT-WOUND ELECTRICITY STORAGE DEVICE CELL AND FLAT-WOUND ELECTRICITY STORAGE DEVICE MODULE

(75) Inventors: Kenro Mitsuda, Tokyo (JP); Daigo Takemura, Tokyo (JP); Shigeru Aihara, Tokyo (JP); Tatsunori Okada, Tokyo (JP); Makiko Kise, Tokyo (JP); Shuichi Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/360,985

(22) Filed: Jan. 30, 2012

(65) Prior Publication Data

US 2012/0189890 A1 Jul. 26, 2012

Related U.S. Application Data

(63) Continuation of application No. PCT/JP2010/064214, filed on Aug. 24, 2010.

(30) Foreign Application Priority Data

Sep. 3, 2009 (JP) ................................. 2009-203485

(51) Int. Cl.
*H01M 10/50* (2006.01)
*H01M 6/10* (2006.01)
*H01M 6/12* (2006.01)
*H01M 2/00* (2006.01)

(52) U.S. Cl.
USPC .............. 429/120; 429/94; 429/162; 429/163

(58) Field of Classification Search
USPC ............. 429/94, 120, 162–164; 361/502, 514
See application file for complete search history.

(56) References Cited

U.S. PATENT DOCUMENTS

| 7,817,404 | B2 * | 10/2010 | Miura et al. ................... 361/518 |
| 2004/0051096 | A1 | 3/2004 | Kingsborough et al. |
| 2004/0175583 | A1 * | 9/2004 | Saijo et al. ..................... 428/461 |
| 2008/0070111 | A1 * | 3/2008 | Abe et al. ....................... 429/163 |
| 2009/0136832 | A1 | 5/2009 | Mitsuda et al. |

FOREIGN PATENT DOCUMENTS

| JP | 2005-203192 | 7/2005 |
| JP | 2005-539395 | 12/2005 |
| JP | 2007-165698 | 6/2007 |
| JP | 2008-153282 | 7/2008 |
| JP | 2009-124073 | 6/2009 |

OTHER PUBLICATIONS

International Search Report mailed Nov. 22, 2010, issued for PCT/JP2010/064214, filed Aug. 24, 2010.

* cited by examiner

*Primary Examiner* — Muhammad Siddiquee
(74) *Attorney, Agent, or Firm* — Oblon, Spivak, McClelland, Maier & Neustadt, L.L.P.

(57) ABSTRACT

A cathode terminal includes a cathode collector foil connector connected to the blank of a cathode collector foil, a cathode terminal external lead-out portion, and an intra-cell cathode terminal radiator located between the cathode collector foil connector and the cathode terminal external lead-out portion and covering approximately half of one of the wide side surfaces of a flat-wound electrode portion. An anode terminal includes an anode collector foil connector connected to the blank of an anode collector foil, an anode terminal external lead-out portion, and an in-cell anode terminal radiator located between the anode collector foil connector and the anode terminal external lead-out portion and substantially covering a remaining portion of the one of the wider side surfaces of the flat-wound electrode portion.

7 Claims, 9 Drawing Sheets

FLAT-WOUND ELECTRICITY STORAGE DEVICE CELL AND FLAT-WOUND ELECTRICITY STORAGE DEVICE MODULE

TECHNICAL FIELD

The present invention relates to an electricity storage device cell including electrodes wound in flat, such as an electric double-layer capacitor, a lithium ion battery, and a lithium ion capacitor, and to a module constructed by serially connecting a plurality of the electricity storage device cells.

BACKGROUND ART

The electricity storage device cell including electrodes wound in flat and stored in a container includes cells such as the electric double-layer capacitor, the lithium ion battery, and the lithium ion capacitor.

The electric double-layer capacitor includes polarizable electrodes (cathode and anode) facing each other on both sides of a separator, and utilizes an electrostatic capacity of electric double layers formed on surfaces of the polarizable electrodes in an electrolyte.

Moreover, the lithium ion battery includes a cathode made of an oxide of cobalt, nickel, manganese, or the like and an anode made of carbon, and has an advantage in that lithium can be stably charged and stored in the carbon anode.

Moreover, the lithium ion capacitor is being developed as a novel electric double-layer capacitor. The lithium ion capacitor is constructed by an electric double-layer capacitor having an anode doped with lithium ions, and has a characteristic that while an upper limit voltage higher than the electric double-layer capacitor is provided, a lower limit voltage cannot be reduced to 0 V.

Those electricity storage device cells are stored in a sealed container such as an aluminum-laminated container or a metal container, and can thus be constructed inexpensively and compactly. However, the output voltage is as low as approximately 3-4 V and is lower than the rating voltage of the aluminum electrolytic capacitor, which is 400V, and those electricity storage device cells are thus generally used as a module formed by serially connecting the electricity storage device cells, thereby increasing the output voltage.

Electrodes used for the flat-wound electricity storage device cells are formed by applying a cathode electrode layer and an anode electrode layer respectively on a cathode collector foil and an anode collector foil in a strip shape having a thickness of approximately 10 to 30 μm, and winding several meters to several tens of meters of the cathode collector foil and the anode collector foil along with a porous separator in a strip shape made of a cellulose-based or olefin-based resin fabric therebetween about a winding shaft core in a flat shape.

The flat-wound electricity storage device cell constructed in this way allows winding in a short period, and is thus advantageous in mass-productivity and a low cost compared with an electricity storage device cell of a layered type constructed by laminating several tens of electrodes in a rectangular shape.

Note that, the winding shaft core is often used only for the flat winding, and is pulled out from a completed cell. However, if the winding shaft core is left, a winding shaft core in a hollow pipe shape made of a metal such as aluminum or the like or a resin is used.

It is expected that the flat-wound electric double-layer capacitor and lithium ion capacitor be applied to storage of regenerative energy from a motor from an energy saving viewpoint, and if they are used for brake regeneration on a servo motor, a hoisting machine for an elevator, and an electric train, and motor regeneration on a hybrid vehicle and the like, a feature of repeated charge/discharge of a large current exceeding 100 A is required.

If a large current flows, a power loss proportional to the square of the current and the internal resistance is generated, resulting in a degraded charge/discharge efficiency. Moreover, this power loss directly translates into generated heat, and unless the heat is quickly radiated from the collector foils, which are thermal conductors, the temperature increases inside the electricity storage device cell, the performance quickly decreases, and lifetime degradation and the like occur.

In particular, the electrode expands and absorbs the electrolyte, and deficiency of the electrolyte tends to occur, causing accelerated degradation during the charge. Therefore, it is necessary for realizing quick charge/discharge in the flat-wound electricity storage device to greatly increase the heat radiation property from the collector foils, and to greatly decrease collector resistances for preventing the heat generation. The collector resistances as used herein mean electric resistances from the collector foils of the cathode and anode to respective current terminals.

In the conventional flat-wound electricity storage device cell that has been used, a cathode collector foil and an anode collector foil are protruded from separators in directions opposite to each other with respect to the axial direction of winding, cutoff portions and protruded end portions are formed by partially cutting off peripheral portions on which a cathode electrode layer and an anode electrode layer are not formed so as to expose the separators, and the cathode collector foil and the anode collector foil are respectively electrically connected at the protruded end portions in the laminated direction, and are respectively connected electrically to a cathode terminal and an anode terminal.

Moreover, in the flat-wound electricity storage device module that has been used, a plurality of the electricity storage device cells are arranged so that the cathode terminal of an electricity storage device cell and the anode terminal of another neighboring electricity storage device cell are close to each other, and the cathode terminal and the anode terminal are connected by a electrically conductive radiator plate (see Patent Literature 1).

CITATION LIST

Patent Literature

Patent Literature 1: JP 2009-124073 A

SUMMARY OF INVENTION

Technical Problems

The collection and heat radiation are greatly improved compared to a conventional device cell in the flat-wound electricity storage device cell disclosed in Patent Literature 1, but there is a problem in that, because two sides out of four sides of the cell are used for pulling out the collector terminals, the width of the cell cannot be reduced in the axial direction of the winding.

Moreover, though the configuration of the flat-wound electricity storage device module disclosed in Patent Literature 1 is preferred for constructing a thin module by arranging the electricity storage device cells in the widthwise direction, if the electricity storage cells are arranged in the lengthwise direction, there is a problem in that the width of the module cannot be reduced in the axial direction of the winding.

The present invention has been made in view of above-mentioned problems, and therefore has an object to provide a flat-wound electricity storage device cell and a flat-wound electricity storage device module, which efficiently radiate internal heat to the outside from collector foils via electrode terminals, and which are compact in a widthwise direction of the cell and the module with respect to the axial direction of winding.

Solution to Problems

According to the present invention, there is provided a flat-wound electricity storage device cell, including: a flat-wound electrode portion formed by winding a cathode in a strip shape, in which a cathode electrode layer is formed on a cathode collector foil, and an anode in a strip shape, in which an anode electrode layer is formed on an anode collector foil, into a flat shape so as to sandwich a separator in a strip shape having an electric insulation property therebetween; a sealed container for impregnating the flat-wound electrode portion with an electrolyte, and sealing and storing the flat-wound electrode portion; and a cathode terminal and an anode terminal which are electrically insulated from the sealed container and connected respectively to the cathode collector foil and the anode collector foil, in which: the cathode collector foil includes a blank left without the cathode electrode layer being formed at a position where the anode collector foil does not overlap when the cathode electrode layer is laid on the anode electrode layer; the anode collector foil includes a blank without the anode electrode layer being formed at a position where the cathode collector foil does not overlap when the anode electrode layer is laid on the cathode electrode layer; the cathode terminal includes a cathode collector foil connector connected to the blank of the cathode collector foil, a cathode terminal external lead-out portion extending outside from the sealed container, and an intra-cell cathode terminal radiator located between the cathode collector foil connector and the cathode terminal external lead-out portion and covering approximately half of one of wider side surfaces of the flat-wound electrode portion; and the anode terminal includes an anode collector foil connector connected to the blank of the anode collector foil, an anode terminal external lead-out portion extending outside from the sealed container, and an intra-cell anode terminal radiator located between the anode collector foil connector and the anode terminal external lead-out portion and substantially covering a remaining portion of the one of the wider side surfaces of the flat-wound electrode portion further comprising: an inter-terminal electric insulation plate provided between the intra-cell cathode terminal radiator and the intra-cell anode terminal radiator; and a step-absorbing electric insulation plate provided on a surface which is not covered by the intra-cell cathode terminal radiator and the intra-cell anode terminal radiator on the one of the wider side surfaces of the flat-wound electrode portion, wherein a thickness of the step-absorbing electric insulation plate is approximately the same as respective thicknesses of the intra-cell cathode terminal radiator and the intra-cell anode terminal radiator.

According to the present invention, there is also provided a flat-wound electricity storage device module, which is formed by pairing the flat-wound electricity storage device cells according to the present invention and arranging each pair of the flat-wound electricity storage device cells so that main surfaces of the sealed containers, to which the intra-cell cathode terminal radiators of the flat-wound electricity storage device cells face, are opposed to each other while sandwiching an inter-cell radiator plate therebetween, in which the inter-cell radiator plate includes an extension extended along a bottom surface or a side surface of each of the flat-wound electricity storage device cells, and includes a cooling portion connected to the extension, and is provided on the bottom surface.

Advantageous Effects of Invention

According to the flat-wound electricity storage device according to the present invention, the current terminals are configured to include the collector foil connector, the intra-cell terminal radiator, and the terminal external lead-out portion, and the cathode terminal and the anode terminal are pulled out from one side which does not face the winding axial direction via the intra-cell terminal radiators from the protruded end portions. Therefore, the collector foil can be connected at the protruded end portions, the internal heat can be efficiently radiated to the outside from the collector foils via the electrode terminals, and the width of the cell can be reduced on the protruded end portion side.

Moreover, according to the flat-wound electricity storage device module according to the present invention, the main surfaces, on which the intra-cell terminal radiators are provided, are opposed to each other while sandwiching the inter-cell radiator plate therebetween, the extension is provided on the inter-cell radiator plate, and the extension is connected to the cooling portion of the electricity storage device module. Therefore, the internal heat can be efficiently radiated to the outside from the collector foils connected to the protruded end portions via the electrode terminals, and the width of the module can be reduced on the protruded end portion side.

DESCRIPTION OF EMBODIMENTS

Figure 1:
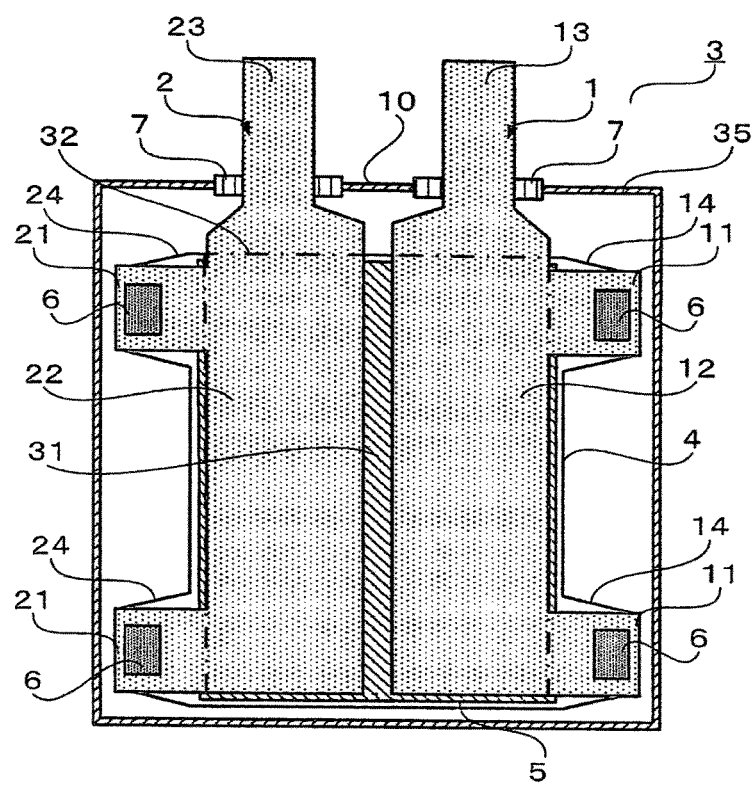
[FIG. 1] A schematic plan view of a flat-wound electricity storage device cell according to a first embodiment of the present invention.

Hereinafter, a description is given of a flat-wound electricity storage device cell according to preferred embodiments of the present invention referring to drawings.
First Embodiment
FIG. 1 is a schematic plan view of a flat-wound electricity storage device cell according to a first embodiment of the present invention. FIG. 1 illustrates an interior of the flat-wound electricity storage device cell while a major surface of a sealed container is omitted.

An electric double-layer capacitor is exemplified as the flat-wound electricity storage device cell according to the first embodiment of the present invention. It should be noted, however, that the present invention is not limited thereto, and is equally applicable to a lithium ion battery, a lithium ion capacitor, and the like.

A flat-wound electricity storage device cell 3 according to the first embodiment includes a flat-wound electrode portion 4 wound in a flat form, a sealed container 10 for impregnating the flat-wound electrode portion 4 with an electrolyte and storing the flat-wound electrode portion 4 in a sealed manner, a cathode terminal 1 electrically insulated from the sealed container 10 and connected to a cathode collector foil, an anode terminal 2 electrically insulated from the sealed container 10 and connected to an anode collector foil, and gas seal portions 7 for insulating the sealed container 10 from the cathode terminal 1 and the anode terminal 2 and sealing the sealed container 10.

Figure 2:
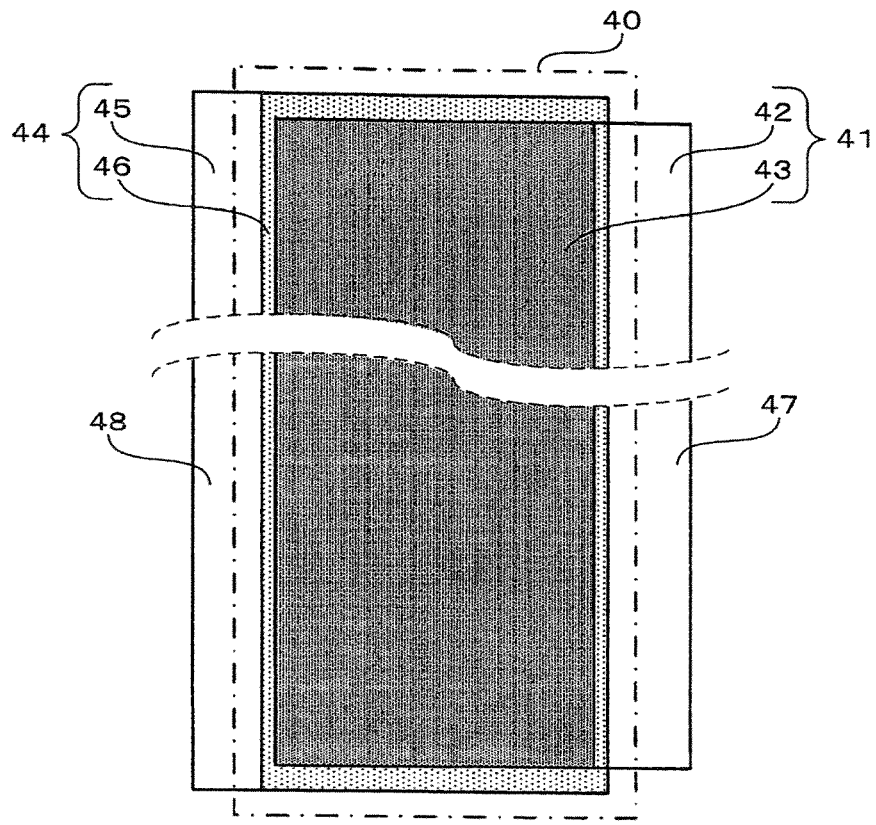
[FIG. 2] A schematic view illustrating an arrangement and sizes of a cathode, an anode, and a separator in strip shapes.

FIG. 2 is a schematic view illustrating an arrangement and sizes of a cathode, an anode, and a separator in strip shapes before the winding.

The flat-wound electrode portion 4 is formed by winding a cathode 41 in a strip shape in which a cathode electrode layer 43 is formed on a cathode collector foil 42, an anode 44 in a strip shape in which an anode electrode layer 46 is formed on an anode collector foil 45, and a separator 40 in a strip shape having an electric insulation characteristic and held between the cathode 41 and the anode 44.

The cathode electrode layer 43 applied to the cathode collector foil 42 and the anode electrode layer 46 applied on a rear surface of the anode collector foil 45 are opposed to each other via the separator 40.

The materials for the cathode electrode layer 43 and the anode electrode layer 46 vary depending on the electric double-layer capacitor, the lithium ion battery, and the lithium ion capacitor. However, materials generally used may be directly applied thereto, and a material formed by adding carbon black as an electric conductive material to active carbon particles, adding a thickener and a binder to form a paste, and applying and drying the paste may be used in the case of the electric double-layer capacitor. The thickness differs depending on application, and is approximately 10-100 μm.

As materials for the separator 40, there may be used cellulose-based materials such as natural pulp, natural cellulose, solvent spun cellulose, and bacterial cellulose, non-woven fabrics including glass fiber and non-fibrillated organic fiber, and fibrillated films and porous films made of aromatic polyamide, wholly aromatic polyamide, aromatic polyester, wholly aromatic polyester, wholly aromatic polyester amide, wholly aromatic polyether, wholly aromatic polyazo compounds, polyphenylene sulfide (PPS), poly-p-phenylenebenzobisthiazole (PBZT), poly-p-phenylenebenzobisoxazole (PBO), polybenzimidazole (PBI), polyether ether ketone (PEEK), polyamide imide (PAI), polyimide, polytetrafluoroethylene (PTFE), and the like. A material having a thickness of about 15 μm to 50 μm, a porosity of about 60 vol % to 80 vol %, and an average porous diameter of several μm to several ten μm is used for the separator.

The electrolyte immersed into the separator 40 varies depending on the electric double-layer capacitor, the lithium ion battery, and the lithium ion capacitor. However, a commonly used material may be used without any treatment, and in the case of the electric double-layer capacitor, for example, a combination of a cation and an anion, such as a salt of a quaternary ammonium, a 1,3-dialkylimidazolium, or a 1,2,3-trialkylimidazolium as the cation and BF4-, PF6-, ClO4-, or CF3SO3- as the anion, or a salt of a 1-ethyl-3-methylimidazolium (EMI) or a 1,2-dimethyl-3-propylimidazolium (DMPI) and AlCl4- or BF4- is used as the electrolyte, and one kind or a mixed solvent of two or more kinds selected from propylene carbonate, ethylene carbonate, dimethyl carbonate, sulfolane, diethyl carbonate, dimethoxymethane, diethoxyethane, γ-butyrolactone, acetonitrile, and propionitrile is used as a solvent for the electric double-layer capacitor. It should be noted that the electrolyte in this embodiment implies an electrolyte solution in a liquid form containing the above-mentioned material.

The lengths of the cathode 41, the anode 44, and the separator 40 are approximately 8 m in the flat-wound electricity storage device cell 3 according to the first embodiment of the present invention. The cathode electrode layer 43 is formed in a state in which a blank remains on a right end on a surface of the cathode collector foil 42 on the cathode 41. The anode electrode layer 46 is formed in a state in which a blank remains on a left end on a surface of the anode collector foil 45 on the anode 44. The anode 44, the separator 40, the cathode 41, and the separator 40 are laminated in this order. On this occasion, the lamination is performed in a displaced manner so that the blank on the right side of the cathode collector foil 42 and the blank on the left side of the anode collector foil 45 are exposed. The separators 40 are wider both widthwise and lengthwise than the cathode electrode layer 43 and the anode electrode layer 46. Moreover, the anode electrode layer 46 is slightly larger than the cathode electrode layer 43. This prevents specific corrosion and degradation from occurring on a part of the cathode electrode layer 43 which is not opposed to the anode electrode layer 46. The same configuration as that of the electric double-layer capacitor is also used for the lithium ion battery and the lithium ion capacitor.

An aluminum foil having a thickness of approximately 20-30 μm is used as the cathode collector foil 42, and an aluminum foil having a thickness of approximately 20 μm or a copper foil having a thickness of approximately 10-20 μm is used as the anode collector foil 45.

The cathode collector foil 42 and the anode collector foil 45 respectively include blanks on which the anode electrode layer 43 and the cathode electrode layer 46 are not formed. The cathode collector foil 42 and the anode foil 45 are wound in the lengthwise direction of the strip shape so as to sandwich the separators 40 therebetween, and protrude from the separators 40 in directions opposite to each other with respect to the axis of the winding.

Figure 3:
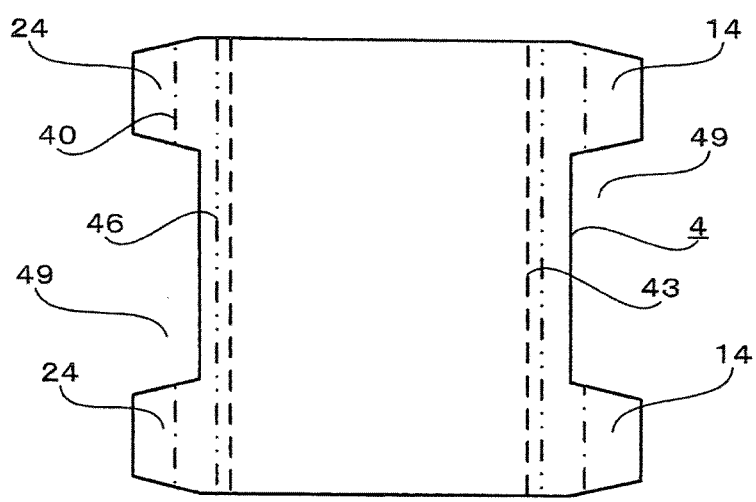
[FIG. 3] A schematic view of a flat-wound electrode portion.

FIG. 3 is a schematic view of the flat-wound electrode portion.

Cathode protruded end portions 14 and anode protruded end portions 24 are produced by separating, by a pressing machine, press-cut portions 49 from the blank 47 on the right side of the cathode collector foil 42 and the blank 48 on the left side of the anode collector foil 45 of the flat-wound electrode portion 4 formed by a winding device as mentioned above.

The cathode collector foil 42 is electrically connected at the cathode protruded end portions 14 of the cathode collector foil 42 in the laminated direction.

The anode collector foil 45 is electrically connected at the anode protruded end portions 24 of the anode collector foil 45 in the laminated direction.

Figure 4:
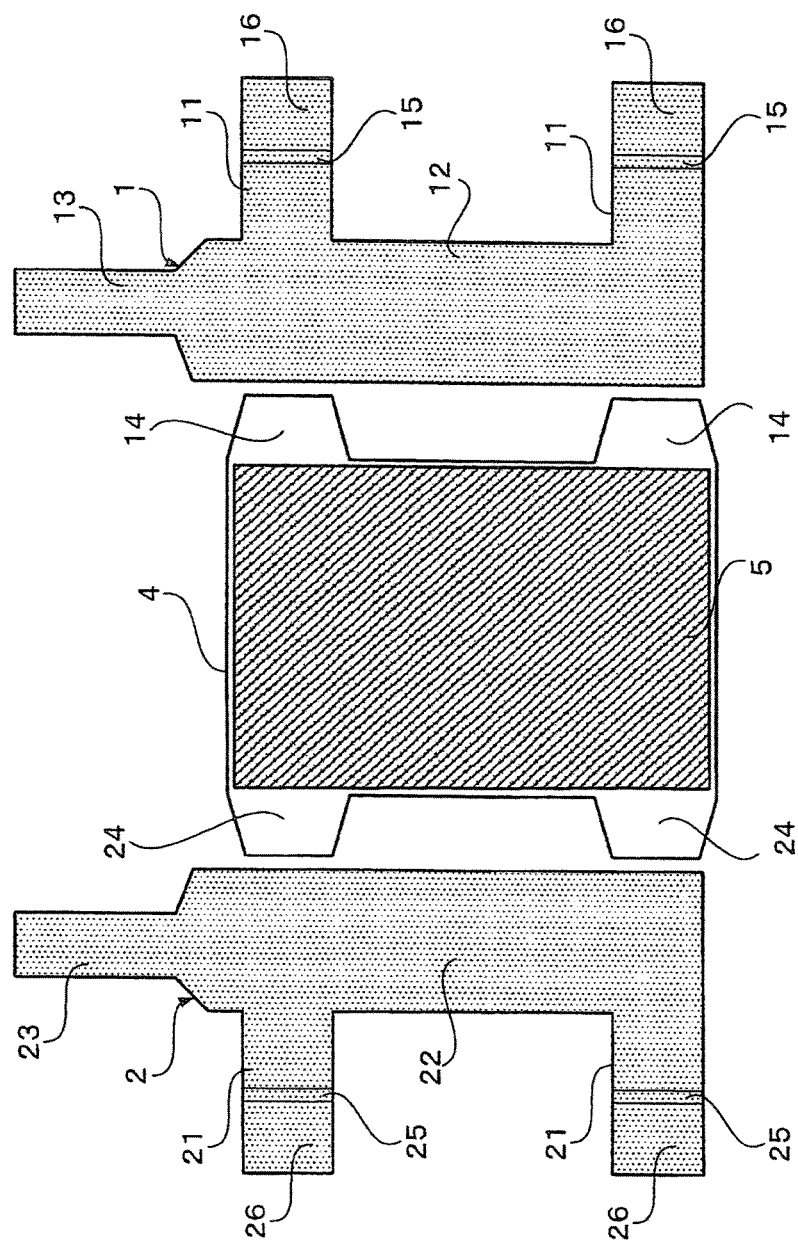
[FIG. 4] A schematic plan view illustrating a cathode terminal and an anode terminal independently before being attached to the flat-wound electrode portion.

FIG. 4 is a schematic plan view illustrating the cathode terminal 1 and the anode terminal 2 independently before being attached to the flat-wound electrode portion 4.

The cathode terminal 1 includes a cathode collector foil connector 11, an intra-cell cathode terminal radiator 12, and a cathode terminal external lead-out portion 13.

The cathode collector foil connector 11 includes cathode terminal folding portions 15 and cathode terminal facing portions 16, the cathode terminal 1 is folded at the cathode terminal folding portions 15 by 180 degrees so as to sandwich the cathode protruded end portions 14 of the cathode collector foil 42, and the cathode protruded end portions 14 of the cathode collector foil 42 and the cathode terminal 1 are electrically connected at connectors 6 by means of the ultrasonic welding or the like.

The intra-cell cathode terminal radiator 12 is opposed to the intra-cell anode terminal radiator 22 via a gap 31, and covers one side of one main surface of the flat-wound electrode portion 4 via a main surface electric insulation sheet 5, to thereby form an intra-cell terminal radiator 32.

The cathode terminal external lead-out portion 13 is pulled out to the outside via the gas seal portion 7 on one side 35 out of two sides in the winding axis direction out of four sides of the sealed container 10.

The anode terminal 2 includes an anode collector foil connector 21, an intra-cell anode terminal radiator 22, and an anode terminal external lead-out portion 23.

The anode collector foil connector 21 includes anode terminal folding portions 25 and anode terminal facing portions 26, the anode terminal 2 is folded at the anode terminal folding portions 25 by 180 degrees so as to sandwich the anode protruded end portions 24 of the anode collector foil 45, and the anode protruded end portions 24 of the anode collector foil 45 and the anode terminal 2 are electrically connected at the connectors 6 by means of the ultrasonic welding or the like.

The intra-cell anode terminal radiator 22 is opposed to the intra-cell cathode terminal radiator 12 via the gap 31, and covers the rest of the one main surface of the flat-wound electrode portion 4 via the main surface electric insulation sheet 5, to thereby form the intra-cell terminal radiator 32.

The anode terminal external lead-out portion 23 is pulled out to the outside via the gas seal portion 7 on the one side 35 out of the two sides in the winding axis direction out of the four sides of the sealed container 10.

Aluminum or stainless steel, which is approximately 0.5-1 mm in thickness, is used as the cathode terminal 1, and aluminum or copper plated by nickel, which is approximately 0.5-1 mm in thickness, is used as the anode terminal 2. The thicknesses of the metal foil and the current terminals are selected according to the magnitude of the current to be extracted, and thicker materials are used as the current increases.

A resin film or a porous sheet made of polycarbonate, polypropylene, polyethylene, or the like may be used as the main surface electric insulation sheet 5. The main surface electric insulation sheet 5, which is approximately 10 μm to 1 mm in thickness, may be used. The thickness of the cell can be reduced as the thickness of main surface electric insulation sheet 5 is reduced, thereby increasing the volume energy density and the weight energy density, but the electric insulation becomes difficult. The same material as that of the separators 40 may be used for the main surface electric insulation sheet 5.

The size of the flat-wound electricity storage device cell 3 depends on the application, but in the first embodiment, the flat-wound electrode portion 4 has the length in the axial direction of the winding of approximately 100 mm, the width of approximately 80 mm, the thickness of approximately 10 mm, and the static capacity of the electric double-layer capacitor of approximately 1000 F.

The sealed container 10 is formed of an aluminum-laminated film, and a portion other than the portions for leading the cathode terminal 1 and the anode terminal 2 to the outside is sealed in advance, and is machined into a pouch form. A polyethylene or polypropylene film is used as a thermal adhesive material.

The flat-wound electrode portion 4 to which the cathode terminal 1 and the anode terminal 2 are connected is inserted into the sealed container 10 so that the cathode terminal external lead-out portion 13 and the anode terminal external lead-out portion 23 protrude outside from an opening portion of the sealed container 10. After the inside of the sealed container 10 is vacuum-drawn from the opening portion to remove water and the like contained in the flat-wound electrode portion 4, the electrolyte is poured inside the sealed container 10 from the opening portion. In the case of the electric double-layer capacitor, an auxiliary charge circuit is used to apply a voltage higher than an operation voltage between the cathode terminal 1 and the anode terminal 2, thereby further removing water and the like. The opening portion is then sealed, thereby completing the flat-wound electricity storage device cell 3.

In the flat-wound electricity storage device cell 3 according to the first embodiment of the present invention, the cathode protruded end portions 14 of the cathode collector foil 42 and the cathode terminal 1 are electrically connected with each other, and the anode protruded end portion 24 of the anode collector foil 45 and the anode terminal 2 are electrically connected with each other. Therefore, the collector resistances can be reduced, and the internal heat can be efficiently radiated to the outside from the cathode collector foil 42 via the cathode terminal 1 and from the anode collector foil 45 via the anode terminal 2.

Moreover, the cathode terminal 1 includes the cathode collector foil connector 11, the intra-cell cathode terminal radiator 12, and the cathode terminal external lead-out portion 13, and the anode terminal 2 includes the anode collector foil connector 21, the intra-cell anode terminal radiator 22, and the anode terminal external lead-out portion 23. Therefore, after the heat collected from the cathode collector foil 42 and the anode collector foil 45 is released at the intra-cell cathode terminal radiator 12 and the intra-cell anode terminal radiator 22, the current can be extracted from the cathode terminal external lead-out portion 13 and the anode terminal external lead-out portion 23. As a result, the temperature of the gas seal portions 7 is prevented from increasing by reducing the heat transmitted to the gas seal portions 7 providing gas seal at the cathode terminal external lead-out portion 13 and the anode terminal external lead-out portion 23, thereby maintaining the temperature of the gas seal portions 7 at a low temperature, and preventing a gas seal property from decreasing even if a quick charge/discharge is carried out at a large current.

The gas seal portions 7 are made of a thermoplastic resin such as polyethylene or polypropylene and is softened at a temperature equal to or more than 120° C. Therefore, the gas seal property degrades at a high temperature equal to or more than 120° C., and water in the atmosphere enters into the sealed container 10 and reacts with an organic solvent and the electrolyte, thereby possibly generating a gas, degrading the cell, and expanding the sealed container. However, the above-mentioned configuration can prevent the gas seal property from decreasing.

An electrolyte reservoir in contact with the exposed separators 40 may be provided between the cathode protruded portions 14, thereby promoting the movement of the electrolyte to the separators 40, compensating the excess or deficiency of the electrolyte of the separators 40 by the electrolyte reservoir, and maintaining a state in which the separators 40 are always filled with the electrolyte in response to increase/decrease of the electrolyte caused by the charge/discharge. The structure of the first embodiment of the present invention does not constitute an obstruction against the installation of the electrolyte reservoir.

In the flat-wound electrode portion 4 according to the first embodiment, the cathode protruded end portions 14 and the anode protruded end portions 24 are respectively provided at the two locations, the cathode foil connectors 11 of the cathode terminal 1 are provided at the two locations, and the anode collector foil connectors 21 of the anode terminal 2 are provided at the two locations. However, when the respective members are provided only at one location, or at three or more locations, and the same effect is provided.

Second Embodiment

Referring to FIGS. 5 to 8, a description is now given of an electricity storage device module using the flat-wound electricity storage device cells 3 according to the first embodiment of the present invention.

Figure 5:
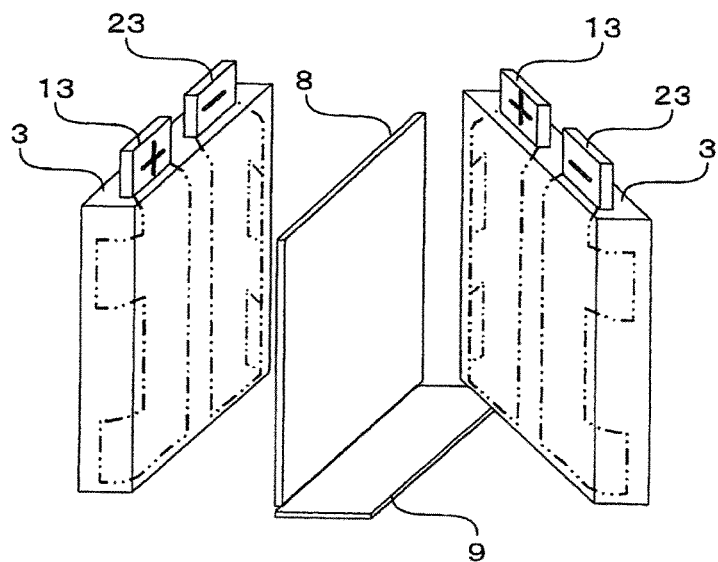
[FIG. 5] A schematic view illustrating a state in which an inter-cell radiator plate is sandwiched between the flat-wound electricity storage device cells according to the first embodiment of the preset invention.
Figure 6:
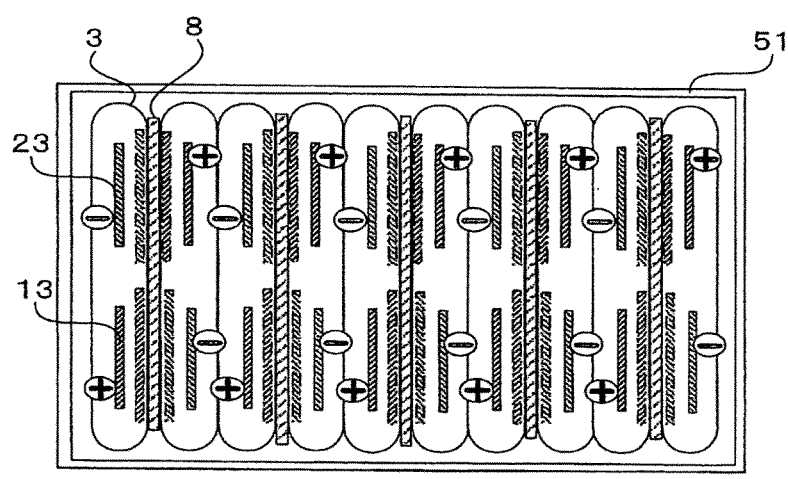
[FIG. 6] A plan view before connection of an electricity storage device module using ten flat-wound electricity storage device cells according to the first embodiment of the present invention.
Figure 7:
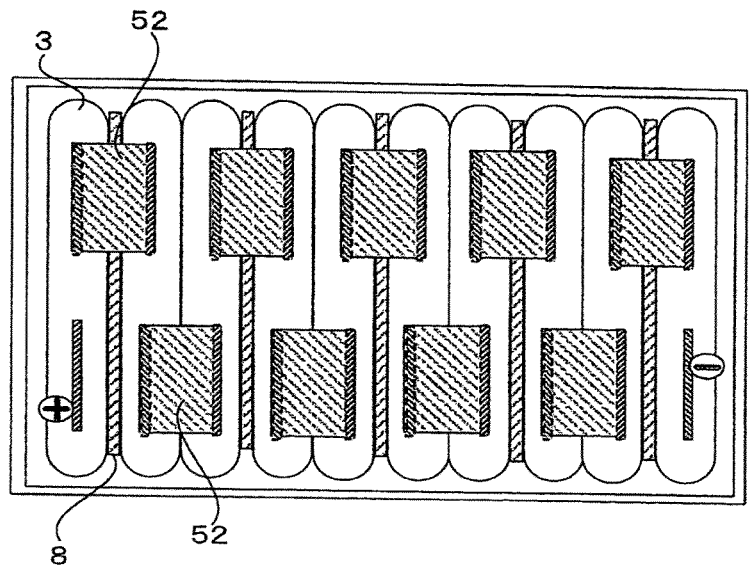
[FIG. 7] A plan view after the connection of the electricity storage device module using the ten flat-wound electricity storage device cells according to the first embodiment of the present invention.
Figure 8:
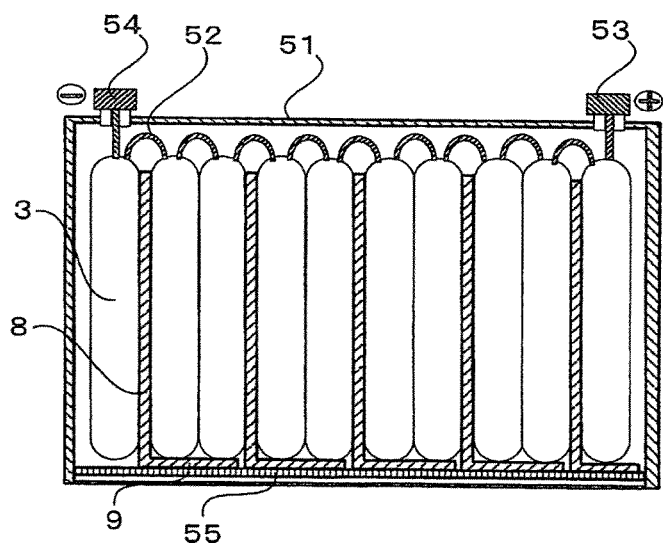
[FIG. 8] A side view after the connection of the electricity storage device module using the ten flat-wound electricity storage device cells according to the first embodiment of the present invention.

FIG. 5 is a schematic view illustrating a state in which an inter-cell radiator plate 8 is sandwiched between the flat-wound electricity storage device cells 3 according to the first embodiment of the preset invention. FIG. 6 is a plan view before connection of an electricity storage device module using ten flat-wound electricity storage device cells 3 according to the first embodiment of the present invention. FIGS. 7 and 8 are a plan view and a front view after the connection of the 10-cell module using the ten flat-wound electricity storage device cells.

The flat-wound electricity storage device cells 3 in the flat-wound electricity storage device module according to the second embodiment of the present invention are the flat-wound electricity storage device cells according to the first embodiment. One of the two wider side surfaces of the flat sealed container 10 of this flat-wound electricity storage device cell 3, with which the intra-cell terminal radiator 32 is in contact, serves as a main surface in terms of the heat radiation.

The ten flat-wound electricity storage device cells 3 are then arranged in line, and stored in a module container 51 made of plastic in the flat-wound electricity storage device module. The flat-wound electricity storage device cells 3 arranged in line are divided in pairs, and the divided pairs of flat-wound electricity storage device cells 3 are arranged so that the respective main surfaces face each other with the inter-cell radiator plate 8 interposed therebetween.

The inter-cell radiator plate 8 includes an inter-cell radiator plate extension 9, and the inter-cell radiator plate extension 9 is in contact with a cooling portion 55 on a bottom surface of the electricity storage device module.

The cathode terminal 1 of one flat-wound electricity storage device cell 3 and the anode terminal of a neighboring flat-wound electricity storage device cell 3 are connected by means of ultrasonic welding or the like, thereby forming an inter-cell connector 52. The ten flat-wound electricity storage device cells are serially connected between a plus terminal 53 and a minus terminal 54.

According to the flat-wound electricity storage device module of the second embodiment of the present invention, the inter-cell radiator plates 8 inserted every two flat-wound electricity storage device cells 3 collect heat, thereby radiating the heat outside the flat-wound electricity storage device module. Thus, the heat collected from the cathode collector foil 42 and the anode collector foil 45 of each of the flat-wound electricity storage device cells 3 is radiated to the inter-cell radiator plates 8 by the intra-cell cathode terminal radiator 12 and the intra-cell anode terminal radiator 22, and the current can be then extracted from the cathode terminal external lead-out portion 13 and the anode terminal external lead-out portion 23. As a result, the temperature of the gas seal portions 7 is prevented from increasing by reducing the heat transmitted to the gas seal portions 7 that provide gas seal at the cathode terminal external lead-out portion 13 and the anode terminal external lead-out portion 23, thereby maintaining the temperature of the gas seal portions 7 at a low temperature, and preventing the gas seal property from decreasing even if a quick charge/discharge is repeated at a large current.

Moreover, according to the flat-wound electricity storage device module of the second embodiment of the present invention, the heat is efficiently transmitted from the inter-cell radiator plate extension 9 to the cooling portion 55 provided on the bottom surface of the module container 51. Thus, only a part of the flat-wound electricity storage device module needs to be cooled by means of air-cooling or water-cooling.

Note that, the inter-cell radiator plate extension 9 may be in contact with both the side surfaces or one side surface of the module container 51 instead of the bottom surface. In this case, by providing the cooling portion 55, which is provided on the bottom surface according to the second embodiment, on the side surface, the same effect as that of the second embodiment may be obtained.

Moreover, if a cool storage material is brought into contact with the inter-cell radiator plate extension 9 or the cooling portion 55, when the temperature reaches a certain temperature or more by chance, cooling is performed by the latent heat effect of the cool storage material, thereby preventing the temperature from rising. A material which melts and softens at a temperature exceeding 100° C. to absorb heat is preferred as the cool storage material, and thermoplastic resin such as polyethylene and polypropylene, molten salt, and saccharides can be employed. The cool storage material may be situated inside the module container 51. Moreover, the cool storage material may form a part of the module container 51.

Moreover, the cool storage material may be in contact with the outside of the cooling portion 55. The form in which the cool storage material is in contact with the inter-cell radiator plate extension 9 or the cooling portion 55 is particularly effective for a case in which a high temperature may be provided from the outside, such as a case in which the temperature exceeds 100° C. due to a large current and a case of installation in an engine room of a motor vehicle.

Third Embodiment

Figure 9:
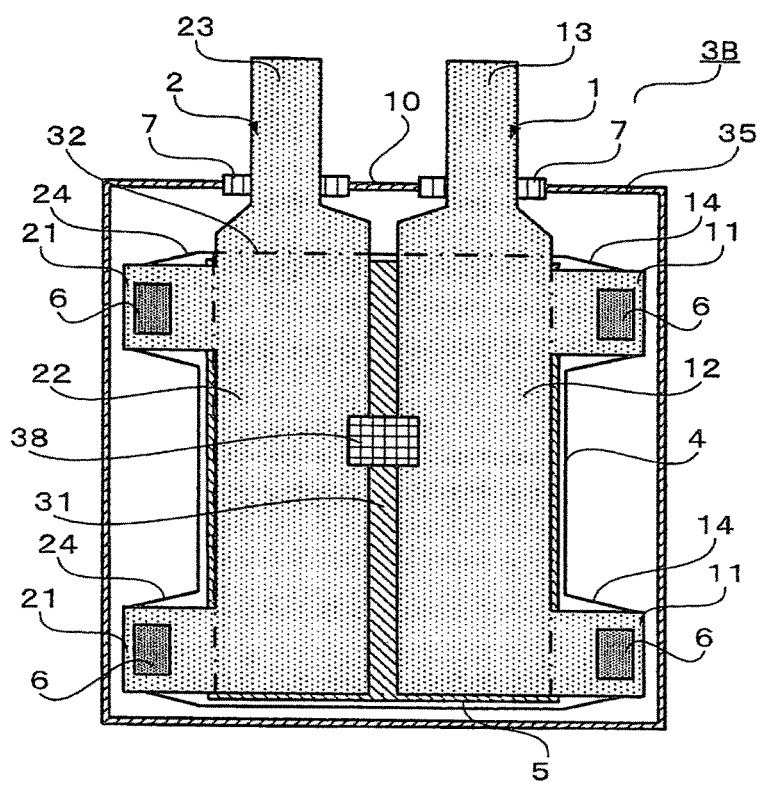
[FIG. 9] A schematic view of a flat-wound electricity storage device cell according to a third embodiment of the present invention.

FIG. 9 is a schematic view of a flat-wound electricity storage device cell according to a third embodiment of the present invention.

A flat-wound electricity storage device cell 3B according to the third embodiment of the present invention is different from the flat-wound electricity storage device cell 3 according to the first embodiment of the present invention in that a balance resistor 38 is added to the flat-wound electricity storage device cell 3 according to the first embodiment of the present invention, and the rest is the same as the flat-wound electricity storage device cell 3 according to the first embodiment of the present invention. Hence, like components are denoted by like numerals, and description thereof is omitted.

Titanium particles along with 10 wt % of polytetrafluoroethylene (PTFE) as a binder are rolled into a sheet form having a thickness of 0.1 mm. The resultant sheet is cut into a size of 50 mm×50 mm, and is then used as the balance resistor 38.

The balance resistor 38 is in contact both with the intra-cell cathode terminal radiator 12 and the intra-cell anode terminal radiator 22 while being bridged therebetween.

The balance resistor 38 is a protection circuit, which causes a leak current to gradually flow through the balance resistor 38, thereby preventing the cell voltage of the flat-wound electricity storage device cell from being maintained at high level. The balance resistor 38 particularly provides a large effect for the case of the flat-wound electricity storage device module in which the flat-wound electricity storage device cells are serially connected, and also serves to resolve the imbalance in the cell voltage of each of the flat-wound electricity storage device cells.

The balance resistor 38 according to the third embodiment serves as the protection circuit, and is made of titanium, which is a semiconductor. Thus, the resistance thereof decreases, and a short-circuit current flows if a voltage equal to or more than 3 V as a band gap thereof is applied between the cathode and the anode, thereby preventing the cell voltage from rising to 3 V or more. Degradations such as electrolyte decomposition, resulting in gas generation, a capacity decrease, and an increase in the internal resistance of the cell, may occur at the cell voltage of 3 V or more, but the possibility can be avoided by providing the balance resistor 38.

Moreover, components for soldering and connection are not necessary, and hence the connection inside the cell can be provided, and an effect of simplifying the process is provided.

Moreover, a protection circuit that is usually used is not necessary by providing the balance resistor 38.

Note that, the balance resistor 38 does not need to be a semiconductor unlike the third embodiment, and a resistive element used for the ordinary resistor may be used. Approximately 100Ω to 500Ω are preferred as the resistance of the balance resistor 38. If the resistance is too small, a large leak current flows, and the energy efficiency thus degrades. On the other hand, if the resistance is too large, the function as the balance resistor 38 is weakened.

Fourth Embodiment

Figure 10:
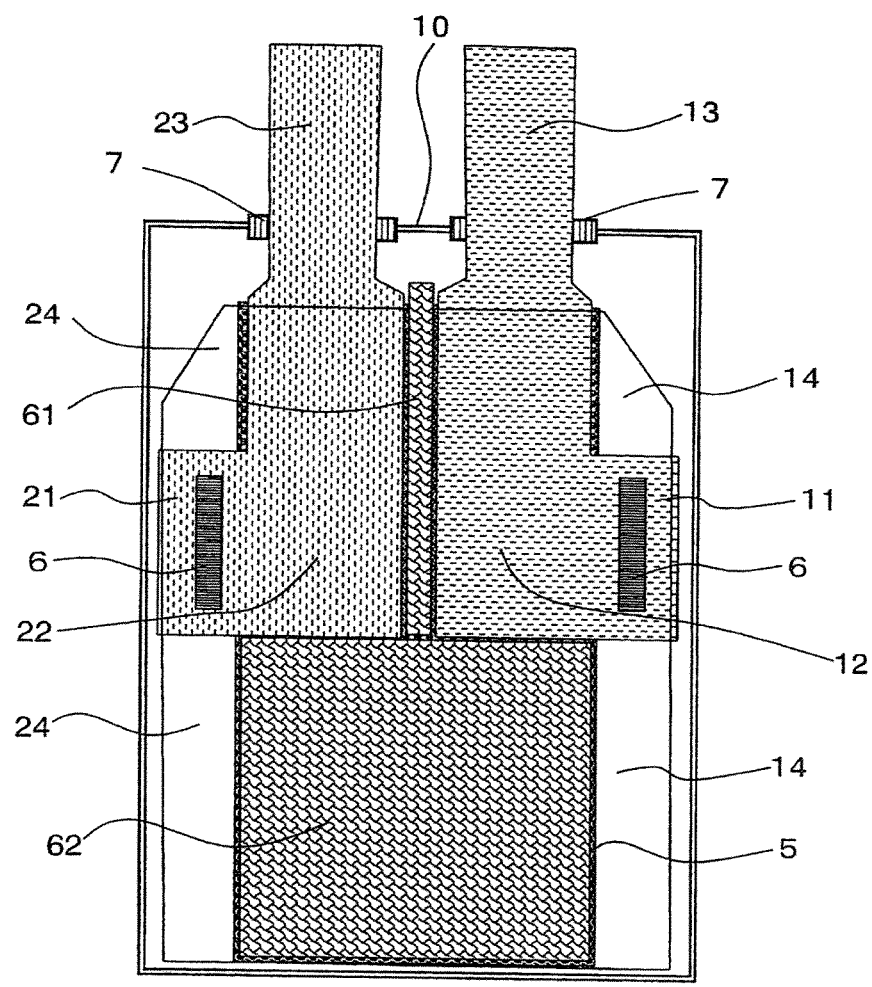
[FIG. 10] A schematic view of a flat-wound electricity storage device cell according to a fourth embodiment of the present invention.

FIG. 10 is a schematic view of a flat-wound electricity storage device cell according to a fourth embodiment of the present invention.

As illustrated in FIG. 10, the flat-wound electricity storage device cell according to the fourth embodiment includes an inter-terminal electric insulation plate 61 arranged between the intra-cell cathode terminal radiator 12 and the intra-cell anode terminal radiator 22. The flat-wound electricity storage device cell according to the fourth embodiment further includes a step-absorbing electric insulation plate 62 arranged on one of the wider side surfaces of the flat-wound electrode portion, which is not covered by the intra-cell cathode terminal radiator 12 and the intra-cell anode terminal radiator 22. On this occasion, the thickness of the step-absorbing electric insulation plate 62 is approximately the same as the thicknesses of the intra-cell cathode terminal radiator 12 and the intra-cell anode terminal radiator 22.

Various resins and the like may be used as the inter-terminal electric insulation plate 61 and the step-absorbing electric insulation plate 62, and polyethylene (PE) resin, polypropylene (PP) resin, polyethylene-telephthalate (PET) resin, and the like are preferred. Moreover, it is preferred that the thicknesses of the inter-terminal electric insulation plate 61 and the step-absorbing electric insulation plate 62 be approximately the same as the thicknesses of the intra-cell cathode terminal radiator 12 and the intra-cell anode terminal radiator 22. By reducing the step, adhesion to the neighboring cells can be secured, and the contact pressure can be uniform if the flat-wound electricity storage device cells are stacked. A high-heat transfer sheet and a rubber may be used in place of the resin. Note that, no problem is caused even if the thickness of the inter-terminal electric insulation plate 61 is smaller than those of the intra-cell cathode terminal radiator 12 and the intra-cell anode terminal radiator 22, but the thickness is preferably approximately the same. Moreover, the inter-terminal electric insulation plate 61 and the step-absorbing electric insulation plate 62 may be integrated with each other, and may be made of the same material.

The flat-wound electricity storage device cell according to the fourth embodiment has smaller areas of the intra-cell cathode terminal radiator 12 and the intra-cell anode terminal radiator 22 within the one of the wider side surfaces, namely the main surface of the wound electricity storage device cell compared with other embodiments, and one connector 6 is provided for each of the cathode and anode. As a result, the heat radiation function from the intra-cell electrode terminal radiator decreases, but a cost for the terminal materials can be reduced, and a manufacturing cost for connecting connectors can be reduced while the internal resistance is maintained at low level.

Fifth Embodiment

Figure 11:
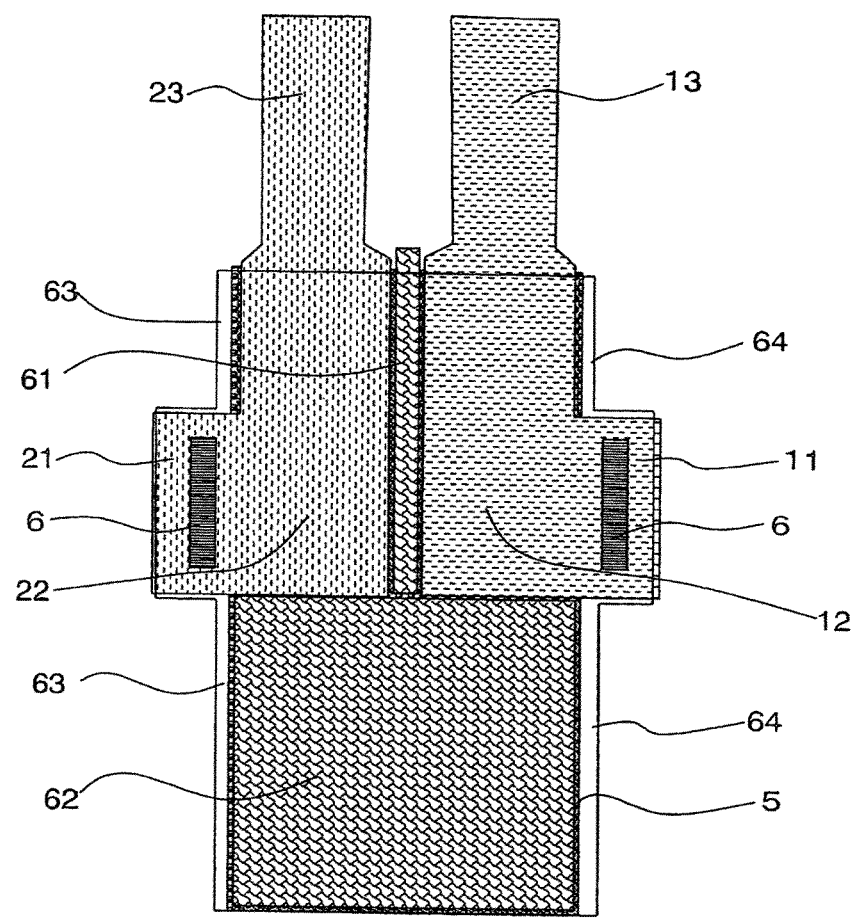
[FIG. 11] A schematic view of a flat-wound electricity storage device cell according to a fifth embodiment of the present invention, illustrating a state in which most parts of a blank of a cathode collector foil and a blank of an anode collector foil are cut off.

FIG. 11 is a schematic view of a state in which most parts of the blank of the cathode collector foil and the blank of the anode collector foil of a flat-wound electricity storage device cell according to the fourth embodiment of the present invention are cut off.

The most parts of the blank of the cathode collector foil and the blank of the anode collector foil are cut off, and the cathode collector foil connector 11 and the anode collector foil connector 21 protrude from both the side surfaces with respect to a blank 63 of the anode collector foil remaining after the cut-out and a blank 64 of the cathode collector foil remaining after the cut-out. Down-sizing can be provided in the widthwise direction in FIG. 11 by folding the protruded cathode collector foil connector 11 and anode collector foil connector 12.

Figure 12:
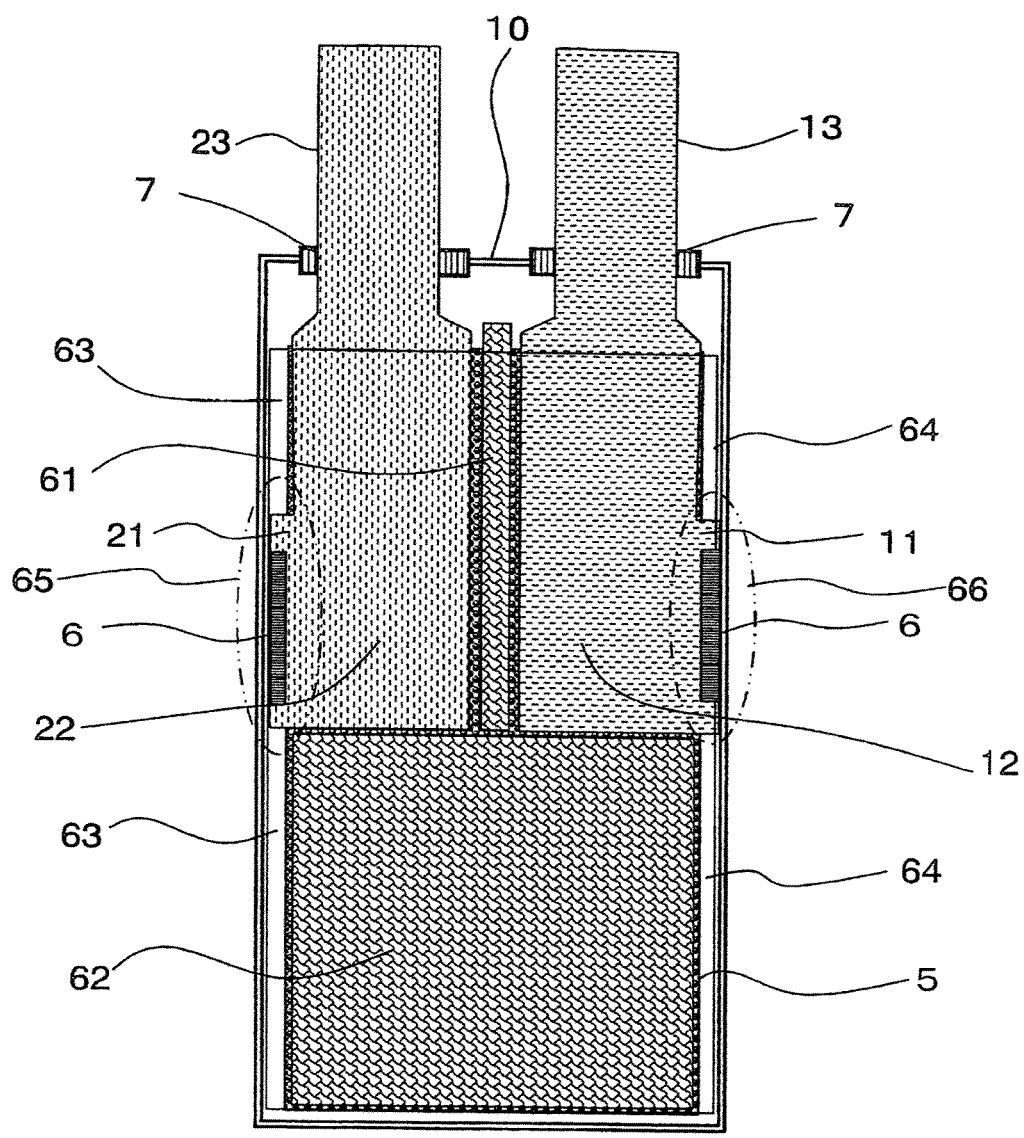
[FIG. 12] A schematic view of the flat-wound electricity storage device cell according to the fifth embodiment of the present invention, in a state of being stored in a sealed container while the cathode collector foil connector and the anode collector foil connector are folded.

FIG. 12 is a schematic view of a state in which the cathode collector foil connector 11 and the anode collector foil connector 21 are folded and stored in the sealed container. Specifically, FIG. 12 illustrates a state in which the flat-wound electricity storage device cell according to the fifth embodiment having the configuration illustrated in FIG. 11 is stored in the sealed container 10 by providing a folding structure by means of an anode connection folding portion 65 and a cathode connection folding portion 66. In this way, the flat-wound electricity storage device cell according to the fifth embodiment having the configuration illustrated in FIG. 12 can be downsized in the widthwise direction compared with the fourth embodiment in FIG. 10, thereby providing a structure that allows a reduction in size of the sealed container 10. Moreover, a weight corresponding to the blank of the cathode collector foil and the blank of the anode collector foil which are cut off is reduced, thereby increasing the energy density and the output density.

Reference Signs List 1 cathode terminal, 2 anode terminal, 3, 3B flat-wound electricity storage device cell, 4 flat-wound electrode portion, 5 main surface electric insulation sheet, 6 connector, 7 gas seal portion, 8 inter-cell radiator plate, 9 inter-cell radiator plate extension, 10 sealed container, 11 cathode collector foil connector, 12 intra-cell cathode terminal radiator, 13 cathode terminal external lead-out portion, 14 cathode protruded end portion, 15 cathode terminal folding portion, 16 cathode terminal facing portion, 21 anode collector foil connector, 22 intra-cell anode terminal radiator, 23 anode terminal external lead-out portion, 24 anode protruded end portions, 25 anode terminal folding portion, 26 anode terminal facing portion, 31 gap, 32 intra-cell terminal radiator, 35 side, 38 balance resistor, 40 separator, 41 cathode, 42 cathode collector foil, 43 cathode electrode layer, 44 anode, 45 anode collector foil, 46 anode electrode layer, 47, 48 blank, 49 press-cut portion, 51 module container, 52 inter-cell connector, 53 plus terminal, 54 minus terminal, 55 cooling portion, 61 inter-terminal electric insulation plate, 62 step-absorbing electric insulation plate, 63 blank of anode collector foil remaining after cut-out, 64 blank of cathode collector foil remaining after cut-out, 65 anode connection folding portion, 66 cathode connection folding portion.

The invention claimed is:

1. A flat-wound electricity storage device cell, comprising:
a flat-wound electrode portion formed by winding a cathode in a strip shape, in which a cathode electrode layer is formed on a cathode collector foil, and an anode in a strip shape, in which an anode electrode layer is formed on an anode collector foil, into a flat shape so as to sandwich a separator in a strip shape having an electric insulation property therebetween;
a sealed container for impregnating the flat-wound electrode portion with an electrolyte, and sealing and storing the flat-wound electrode portion; and
a cathode terminal and an anode terminal which are electrically insulated from the sealed container and connected respectively to the cathode collector foil and the anode collector foil, wherein:
the cathode collector foil includes a blank left without the cathode electrode layer being formed at a position where the anode collector foil does not overlap when the cathode electrode layer is laid on the anode electrode layer;
the anode collector foil includes a blank without the anode electrode layer being formed at a position where the cathode collector foil does not overlap when the anode electrode layer is laid on the cathode electrode layer;
the cathode terminal includes a cathode collector foil connector connected to the blank of the cathode collector foil, a cathode terminal external lead-out portion extending outside from the sealed container, and an intra-cell cathode terminal radiator located between the cathode collector foil connector and the cathode terminal external lead-out portion and covering a part of one of wider side surfaces of the flat-wound electrode portion; and
the anode terminal includes an anode collector foil connector connected to the blank of the anode collector foil, an anode terminal external lead-out portion extending outside from the sealed container, and an intra-cell anode terminal radiator located between the anode collector foil connector and the anode terminal external lead-out portion and covering a remaining portion of the one of the wider side surfaces of the flat-wound electrode portion;
further comprising, within the sealed container sealing and storing the flat-wound electrode portion:
an inter-terminal electric insulation plate provided between the intra-cell cathode terminal radiator and the intra-cell anode terminal radiator to separate the intra-cell cathode terminal radiator and the intra-cell anode terminal radiator from each other; and
a step-absorbing electric insulation plate provided on the one of the wider side surfaces of the flat-wound electrode portion which is not covered by the intra-cell cathode terminal radiator,
wherein a thickness of the step-absorbing electric insulation plate is approximately the same as respective thicknesses of the intra-cell cathode terminal radiator and the intra-cell anode terminal radiator.

2. A flat-wound electricity storage device cell according to claim 1, wherein:
the blank of the cathode collector foil is a remaining protruded end portion which is brought to the same position as the cathode collector foil when it is wound in flat along with the separator and the anode collector foil; and
the blank of the anode collector foil is a remaining protruded end portion which is brought to the same position as the anode collector foil when it is wound in flat along with the separator and the cathode collector foil.

3. A flat-wound electricity storage device cell according to claim 1, comprising a balance resistor for connecting the intra-cell cathode terminal radiator and the intra-cell anode terminal radiator with each other.

4. A flat-wound electricity storage device cell according to claim 3, wherein the balance resistor contains semiconductor particles, and is formed into a sheet shape.

5. A flat-wound electricity storage device module, which is formed by pairing a plurality of the flat-wound electricity storage device cells according to any of claims 1 to 4 and arranging each pair of the flat-wound electricity storage device cells so that main surfaces of the sealed containers, to which the intra-cell cathode terminal radiators of the flat-wound electricity storage device cells face, are opposed to each other while sandwiching an inter-cell radiator plate therebetween,
wherein the inter-cell radiator plate includes an extension extended along a bottom surface or a side surface of each of the flat-wound electricity storage device cells, and includes a cooling portion connected to the extension, and is provided on the bottom surface.

6. A flat-wound electricity storage device module according to claim 5, wherein the extension or the cooling portion is brought into contact with a cool storage material.

7. A flat-wound electricity storage device cell according to claim 1, wherein:
a blank of the cathode collector foil other than the blank connected to the cathode collector foil connector is cut off;
a blank of the anode collector foil other than the blank connected to the anode collector foil connector is cut off; and the cathode collector foil connector and the anode collector foil connector are folded to be stored in the sealed container.

\* \* \* \* \*